US012690505B2

(12) United States Patent
  Cozza et al.

(10) Patent No.: US 12,690,505 B2
(45) Date of Patent: Jul. 28, 2026

(54) SYSTEM AND METHOD FOR DETECTING SIMULTANEOUS DISK PLUGGING ON A TILLAGE IMPLEMENT

(71) Applicant: CNH Industrial America LLC, New Holland, PA (US)

(72) Inventors: Michael R. Cozza, Pittsburgh, PA (US); Scott Glovier, McMurray, PA (US)

(73) Assignee: CNH Industrial America LLC, New Holland, PA (US)

( * ) Notice: Subject to any disclaimer, the term of this patent is extended or adjusted under 35 U.S.C. 154(b) by 392 days.

(21) Appl. No.: 18/397,238

(22) Filed: Dec. 27, 2023

(65) Prior Publication Data

US 2025/0212712 A1    Jul. 3, 2025

(51) Int. Cl.
  *A01B 33/16*        (2006.01)
  *A01B 33/02*        (2006.01)
(52) U.S. Cl.
  CPC ............ *A01B 33/16* (2013.01); *A01B 33/024* (2013.01)
(58) Field of Classification Search
  CPC .............................. A01B 33/16; A01B 33/024
  See application file for complete search history.

(56) References Cited

U.S. PATENT DOCUMENTS

| | | | |
|---|---|---|---|
| 10,481,142 B2 | 11/2019 | Rhodes et al. | |
| 11,197,402 B2 | 12/2021 | Smith | |
| 11,284,557 B2 * | 3/2022 | Schoeny | A01C 5/068 |
| 11,849,659 B2 * | 12/2023 | Schoeny | A01B 63/112 |
| 2021/0029865 A1 | 2/2021 | Smith et al. | |
| 2021/0345536 A1 | 11/2021 | Bich et al. | |
| 2022/0304213 A1 | 9/2022 | Schroeder | |
| 2022/0308254 A1 | 9/2022 | Schroeder | |

OTHER PUBLICATIONS

Co-Pending U.S. Appl. No. 18/394,739, filed Dec. 22, 2023.

* cited by examiner

*Primary Examiner* — Aryan E Weisenfeld
(74) *Attorney, Agent, or Firm* — Dority & Manning, P.A.

(57) ABSTRACT

A system for detecting simultaneous disk plugging on a tillage implement includes a plurality of disks supported by the frame of the implement. Additionally, the system includes a plurality of load sensors each being configured to generate data indicative of the draft load being applied to the frame by one or more of the disks. Moreover, the system includes a computing system communicatively coupled to the load sensors. The computing system is configured to determine the plurality of draft loads based on the load sensor data. Furthermore, the computing system is configured to determine the total draft load being applied to the frame based on the determined plurality of draft loads. Moreover, the computing system is configured to determine when the majority of the disks are simultaneously plugged based on the determined total draft load.

20 Claims, 6 Drawing Sheets

300

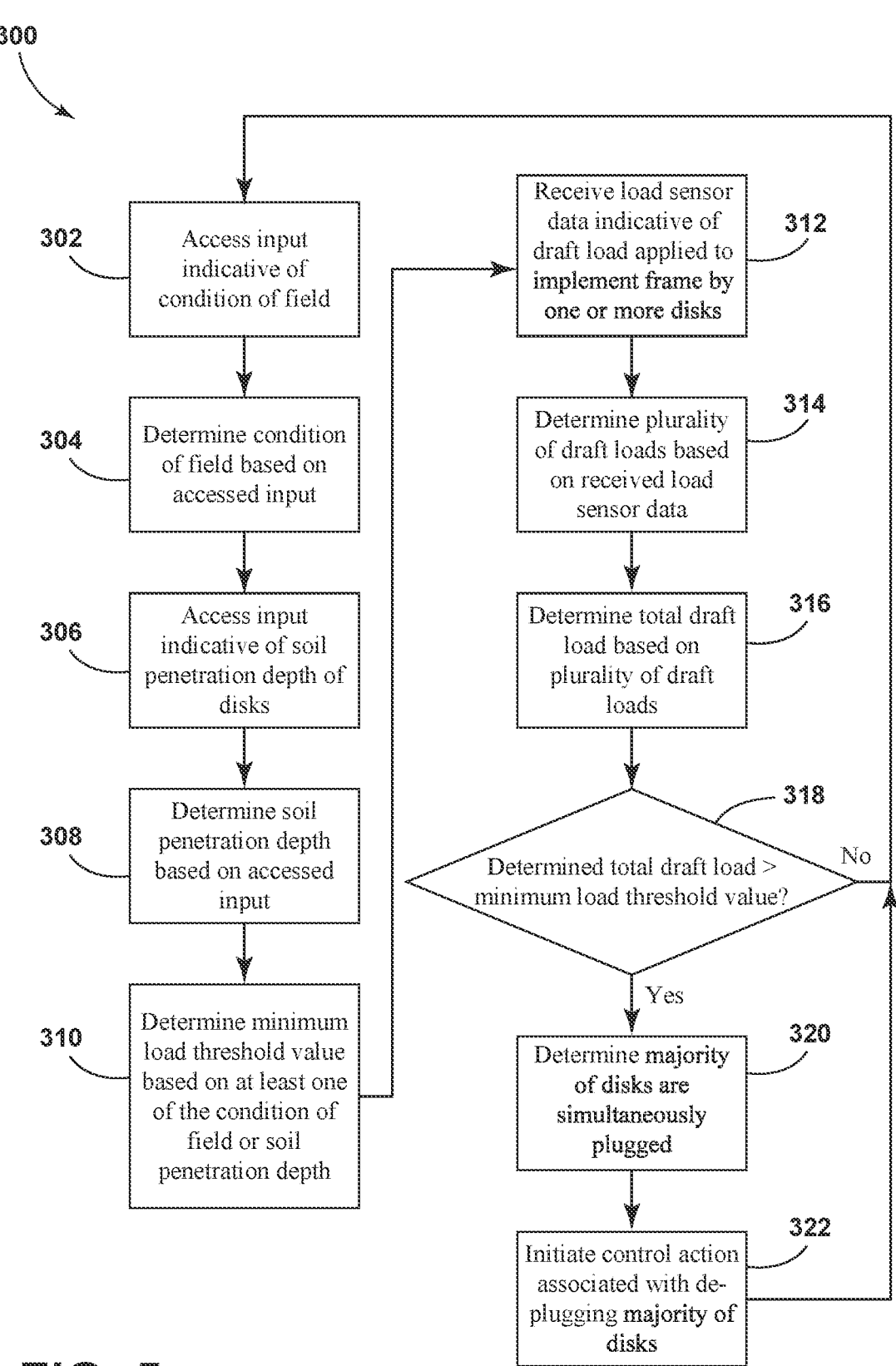

302 Access input indicative of condition of field

304 Determine condition of field based on accessed input

306 Access input indicative of soil penetration depth of disks

308 Determine soil penetration depth based on accessed input

310 Determine minimum load threshold value based on at least one of the condition of field or soil penetration depth

312 Receive load sensor data indicative of draft load applied to implement frame by one or more disks

314 Determine plurality of draft loads based on received load sensor data

316 Determine total draft load based on plurality of draft loads

318 Determined total draft load > minimum load threshold value?   No

Yes

320 Determine majority of disks are simultaneously plugged

322 Initiate control action associated with de-plugging majority of disks

FIG. 5

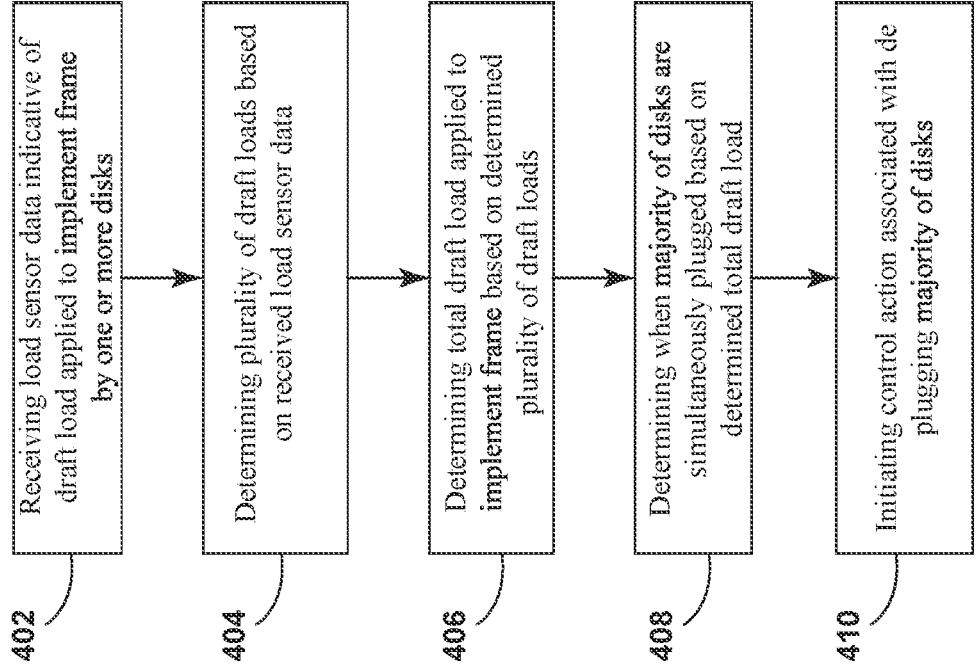

402 — Receiving load sensor data indicative of draft load applied to implement frame by one or more disks 404 — Determining plurality of draft loads based on received load sensor data 406 — Determining total draft load applied to implement frame based on determined plurality of draft loads 408 — Determining when majority of disks are simultaneously plugged based on determined total draft load 410 — Initiating control action associated with de plugging majority of disks

SYSTEM AND METHOD FOR DETECTING SIMULTANEOUS DISK PLUGGING ON A TILLAGE IMPLEMENT

FIELD OF THE INVENTION

The present disclosure generally relates to tillage implements and, more particularly, to systems and methods for detecting simultaneous disk plugging on a tillage implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In certain configurations, tillage implements include one or more disks spaced apart disks supported on its frame, such as by one or more disk gangs. Each disk, in turn, is configured to rotate relative to the soil as the tillage implement travels across the field. The rotation of the disks loosens and/or otherwise agitates the soil to prepare the field for subsequent planting operations.

During tillage operations, field materials, such as residue, soil, rocks, and/or the like, may become trapped or otherwise accumulate between a disk and another component of the tillage implement, such as a scraper, an adjacent disk, C-hanger, and/or the like. When such accumulations of field materials become sufficient to prevent the majority of the disks from providing adequate tillage to the field (e.g., by slowing or preventing rotation of all the disks), the respective majority of the disks are plugged. In such instances, it is necessary for the operator to take certain corrective actions to remove the accumulated field materials. However, it may be difficult for the tillage implement operator to determine when the majority of the disks are plugged. In this respect, systems have been developed to detect simultaneous plugging of the majority of the disks during tillage operations. While such systems work well, further improvements are needed.

Accordingly, an improved system and method for detecting simultaneous disk plugging on a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a tillage implement. The tillage implement includes a frame and a plurality of ground-engaging shanks supported by the frame and configured to till soil of a field as the tillage implement traverses the field. Additionally, the tillage implement includes a plurality of disks supported by the frame. Each disk is configured to rotate relative to the soil of the field. Moreover, the tillage implement includes a plurality of load sensors. Each load sensor of the plurality of load sensors is configured to generate data indicative of a draft load being applied to the frame by at least one disk of the plurality of disks as the tillage implement traverses the field. Additionally, the tillage implement includes a computing system communicatively coupled to the plurality of load sensors. The computing system is configured to determine a plurality of draft loads based on the data generated by the plurality of load sensors, each draft load of the plurality of draft loads being applied to the frame by the at least one disk of the plurality of disks. Moreover, the computing system is configured to determine a total draft load being applied to the frame based on the determined plurality of draft loads. Furthermore, the computing system is configured to determine when a majority of disks, which is more than half of the disks, of the plurality of disks are simultaneously plugged based on the determined total draft load.

In another aspect, the present subject matter is directed to a system for detecting simultaneous disk plugging on a tillage implement. The system includes a plurality of disks supported by a frame of the tillage implement. Each disk is configured to rotate relative to soil of a field. Furthermore, the system includes a plurality of load sensors. Each load sensor of the plurality of load sensors is configured to generate data indicative of a draft load being applied to the frame by at least one disk of the plurality of disks as the tillage implement traverses the field. Moreover, the system includes a computing system communicatively coupled to the plurality of load sensors. The computing system is configured to determine a plurality of draft loads based on the data generated by the plurality of load sensors, each draft load of the plurality of draft loads being applied to the frame by the at least one disk of the plurality of disks. Moreover, the computing system is configured to determine a total draft load being applied to the frame based on the determined plurality of draft loads. Furthermore, the computing system is configured to determine when a majority of disks of the plurality of disks are simultaneously plugged based on the determined total draft load.

In a further aspect, the present subject matter is directed to a method for detecting simultaneous disk plugging on a tillage implement. The tillage implement includes a frame and a plurality of disks supported by the frame. Each disk is configured to rotate relative to soil of a field as the tillage implement traverses the field. The method includes receiving, with a computing system, load sensor data indicative of a draft load being applied to the frame by at least one disk of the plurality of disks as the tillage implement traverses the field. Furthermore, the method includes determining, with the computing system, a plurality of draft loads based on the received load sensor data, each draft load of the plurality of draft loads being applied to the frame by the at least one disk of the plurality of disks. Additionally, the method includes determining, with the computing system, a total draft load being applied to the frame based on the determined plurality of draft loads. Moreover, the method includes determining, with the computing system, when a majority of disks of the plurality of disks are simultaneously plugged based on the determined total draft load. Furthermore, the method includes initiating, with the computing system, a control action associated with de-plugging the majority of disks of the plurality of disks that are simultaneously plugged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 illustrates a flow diagram providing one embodiment of control logic for detecting simultaneous disk plugging on a tillage implement in accordance with aspects of the present subject matter; and FIG. 6 illustrates a flow diagram of one embodiment of a method for detecting simultaneous disk plugging on a tillage implement in accordance with aspects of the present subject matter.

Figure 1:
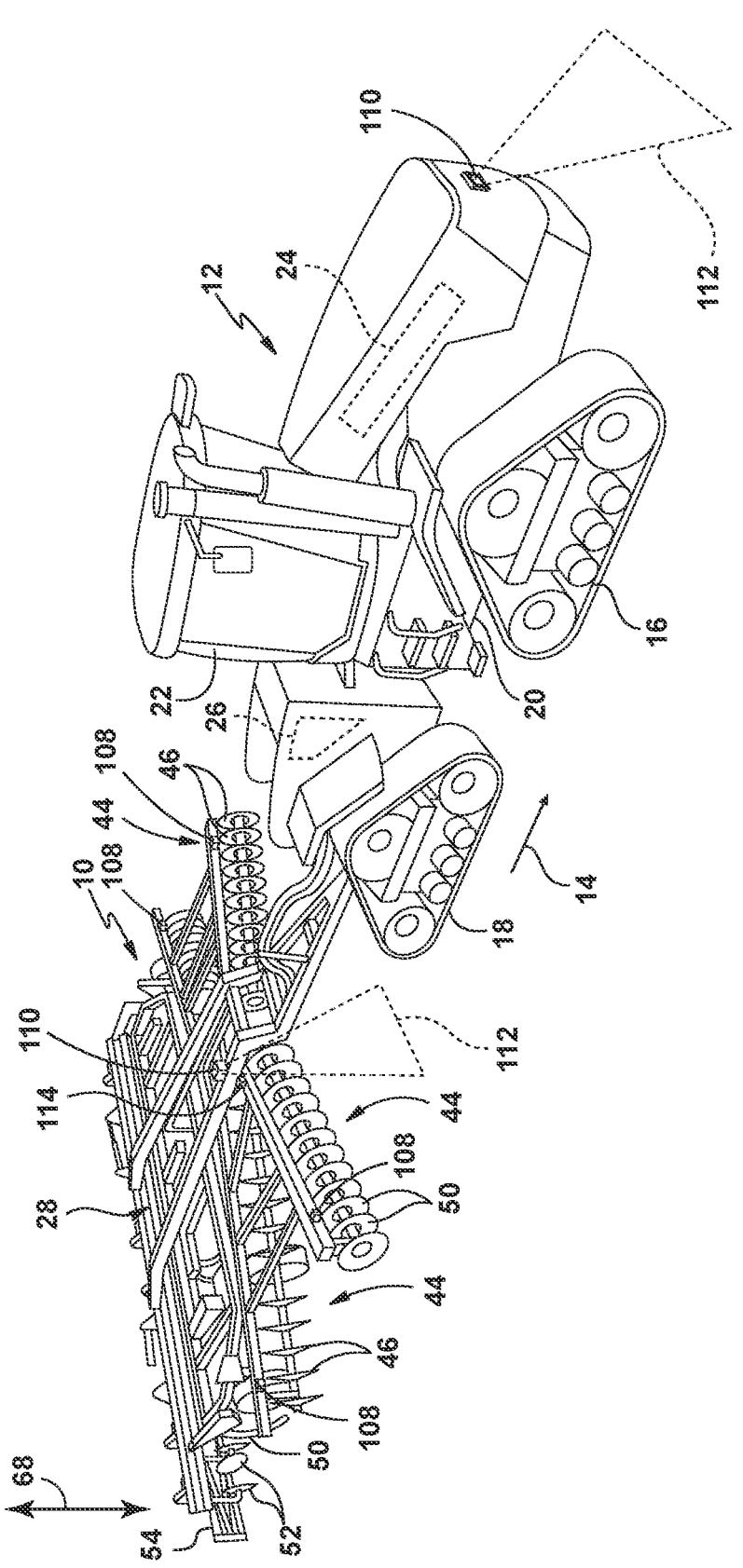
FIG. 1 illustrates a perspective view of one embodiment of a tillage implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting simultaneous disk plugging on a tillage implement. As will be described below, the tillage implement generally includes a frame and a plurality of disks supported by the frame. In this respect, as the tillage implement travels across the field to perform a tillage operation thereon, the disks rotate relative to the field such that field materials (e.g., soil, residue, rocks, etc.) flow between the disks. However, when a sufficient amount of field materials accumulates between the one or more of the disks and another component of the tillage implement, such as a scraper, an adjacent disk, C-hanger, and/or the like, the operation of the disk(s) may be impacted. In such instances, the disk(s) is considered plugged.

In several embodiments, a computing system of the disclosed system is configured to determine when the majority of the disks are simultaneously plugged. More specifically, the computing system determines a plurality of draft loads based on data generated by a plurality of load sensors. Each draft load determined by the computing system is being applied to the implement frame by one or more of the disks. Additionally, the computing system determines the total draft load being applied to the implement frame based on the determined plurality of draft loads. For example, the computing system may sum the determined plurality of draft loads to determine the total draft load. Furthermore, the computing system determines when the majority of the disks are simultaneously plugged based on the determined total draft load. For example, in several embodiments, the computing system accesses an input indicative of one or more conditions of the field, such as accessing a field map identifying the condition(s), such as the type of crop material, of the field at one or more locations within the field, and/or receive an operator input indicative of the condition(s) of the field. Additionally, or alternatively, in several embodiments, the computing system accesses an input indicative of the soil penetration depth of the disks, such as by receiving data indicative of the soil penetration depth of the disks from one or more depth sensors. Moreover, the computing system determines a minimum load threshold value, which is indicative of simultaneous plugging of the majority of the disks, based on the accessed input(s). Thereafter, the computing system is configured to determine when the majority of the disks are plugged based on the determined condition(s) of the field and/or the determined soil penetration depth of the disks. For example, in several embodiments, the computing system is configured to compare the determined total draft load to the determined minimum load threshold value and determine that the majority of the disks are simultaneously plugged when the determined total draft load exceeds the determined minimum load threshold value.

Using a total draft load being applied to the implement frame by one or more of the disks to determine when the majority of the disks are simultaneously plugged improves the operation of the tillage implement. More specifically, the soil applies a total draft load to all of the disks of the disk gangs that engage the soil as the implement traverses the field. When a sufficient amount of field materials accumulates between each of the majority of the disks and another component of the implement, such as a scraper, an adjacent disk, a C-hanger, and/or the like, the majority of the disks are considered simultaneously plugged. When the majority of the disks become simultaneously plugged, the total draft load being applied to the implement frame is greater than it would be when none or only some of the disks are plugged. The total draft load that is indicative of the majority of the disks being simultaneously plugged may vary depending on the condition(s) of the field, such as the soil moisture level, and/or the soil penetration depth of the disks. As described above, the disclosed system and method uses the total draft load being applied to the implement frame to determine when the majority of the disks are simultaneously plugged and, thus, provide for more accurate detection of plugging.

Figure 2:
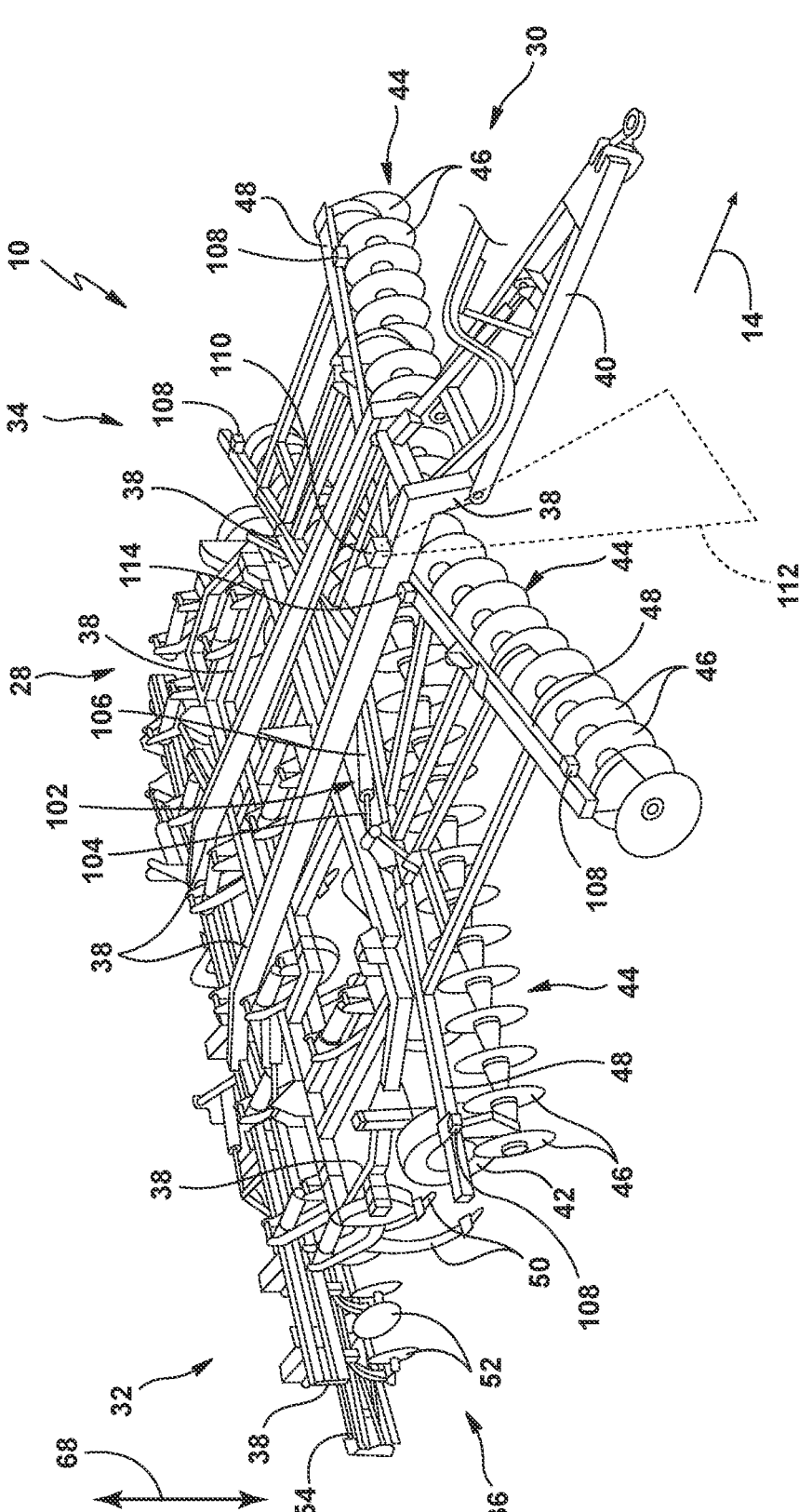
FIG. 2 illustrates another perspective view of the tillage implement shown in FIG. 1, particularly illustrating various components of the tillage implement.

Referring now to the drawings, FIGS. 1 and 2 illustrate differing perspective views of one embodiment of a tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a disk ripper, and the work vehicle 12 is configured as an agricultural tractor. However, in other embodiments, the implement 10 may be configured as any other suitable type of tillage implement. Similarly, the work vehicle 12 may be configured as any other suitable type of vehicle.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 220 shown in FIG. 4) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include an implement frame 28. More specifically, the implement frame 28 may extend longitudinally between a forward end 30 and an aft end 32. The implement frame 28 may also extend laterally between a first side 34 and a second side 36. In this respect, the implement frame 28 generally includes a plurality of structural frame members 38, such as beams, bars, support arms, and/or the like, configured to support or couple to a plurality of components. Furthermore, a hitch assembly 40 may be connected to the implement frame 28 and configured to couple the implement 10 to the work vehicle 12. Additionally, a plurality of wheels 42 (one is shown) may be coupled to the implement frame 28 to facilitate towing the implement 10 in the direction of travel 14.

In several embodiments, the implement frame 28 may be configured to support a plurality of disks 46. For example, as shown in FIGS. 1 and 2, the implement frame 28 may be configured to support one or more gangs or sets 44 of the disks 46. Each disk 46 may, in turn, be configured to penetrate into or otherwise engage the soil as the implement 10 is being pulled through the field. In this regard, the disk gang(s) 44 may be oriented at an angle relative to the direction of travel 14 to promote more effective tilling of the soil. In the embodiment shown in FIGS. 1 and 2, the implement 10 includes four disk gangs 44 supported on the implement frame 28 adjacent to the forward end 30 of the implement frame 28. However, in alternative embodiments, the implement 10 may include any other suitable number of disk gangs 44, such as more or fewer than four disk gangs 44. Furthermore, in one embodiment, the disk gangs 44 may be mounted to the implement frame 28 at any other suitable location, such as adjacent to the aft end 32 of the implement frame 28. Additionally, it should be appreciated that the implement frame 28 may be configured to support the plurality of disks 46 in any other suitable manner. For example, each disk 46 may be individually coupled to the implement frame 28, such as to one of the structural frame members 38, via, for example, one or more fasteners, brackets, and/or the like.

Moreover, in several embodiments, the implement 10 may include a plurality of actuators 102 (one is shown). In general, each actuator 102 is configured to move or otherwise adjust the orientation or position of one or more of the disks 46. For example, in the embodiment shown in FIGS. 1 and 2, the actuators 102 are configured as disk gang actuators configured to move or otherwise adjust the orientation or position of one or more of the disk gangs 44 relative to the implement frame 28. In this respect, a first end of each actuator 102 (e.g., a rod 104 of the actuator 102) is coupled to one of the structural frame members 38 of the main implement frame 28 associated with disk gang 44, while a second end of each actuator 102 (e.g., the cylinder 106 of the actuator 102) is coupled to the frame 28. The rod 104 of each actuator 102 may be configured to extend and/or retract relative to the corresponding cylinder 106 to adjust the angle of the corresponding disk gang 44 relative to a lateral centerline (not shown) of the implement frame 28 and/or the penetration depth of the associated disks 46. In the illustrated embodiment, each actuator 102 corresponds to a fluid-driven actuator, such as a hydraulic or pneumatic cylinder. However, each actuator 102 may correspond to any other suitable type of actuator, such as an electric linear actuator.

Additionally, as shown, in one embodiment, the implement frame 28 may be configured to support other ground engaging tools. For instance, in the illustrated embodiment, the implement frame 28 supports a plurality of ground-engaging shanks 50 configured to rip or otherwise till the soil as the implement 10 is towed across the field. The plurality of ground-engaging shanks 50 may be positioned aft of the disk gang(s) 44. Furthermore, in the illustrated embodiment, the implement frame 28 also supports a plurality of rolling (or crumbler) basket assemblies 52. However, in other embodiments, any other suitable ground-engaging tools may be coupled to and supported by the implement frame 28.

The configuration of the tillage implement 10 and the work vehicle 12 described above and shown in FIGS. 1 and 2 is provided only to place the present subject matter in an exemplary field of use. Thus, the present subject matter may be readily adaptable to any manner of implement and/or vehicle configuration.

Furthermore, the implement 10 may include a plurality of load sensors 108 coupled thereto and/or supported thereon. Each load sensor 108 is configured to generate data indicative of a draft load being applied the implement frame 28 by one or more of the disks 46 during a tillage operation. Such draft loads result from engagement between the disks 46 and the soil into which the disks 46 have penetrated. As will be described below, the data may subsequently be used to determine when the majority of the disks 46 are simultaneously plugged.

In general, the load sensors 108 may correspond to any suitable load sensors configured to generate data indicative of the draft loads being applied to the implement frame 28. In several embodiments, the load sensors 108 may be configured as load cells. However, in alternative embodiments, the load sensors 108 may be configured as any other suitable load sensors for generating data indicative of the draft loads being applied to the implement frame 28, such as strain gauges and/or the like.

Additionally, the implement 10 may include any number of load sensors 108 provided at any suitable location that allows data indicative of the draft loads being applied to the implement frame 28 by one or more of the disks 46 to be generated. In this respect, FIGS. 1 and 2 illustrate example locations for mounting the load sensors 108 for generating data indicative of the draft loads being applied to the implement frame 28. As shown in FIGS. 1 and 2, four load sensors 108 are coupled to the structural frame members 38 of the implement frame 28. For example, the four load sensors 108 may be coupled to the structural frame members 38 between the structural frame members 38 and the disk gangs 44. However, it should be appreciated that the load sensors 108 may be provided at any other suitable location that allows data indicative of the draft loads being applied to the implement frame 28 by one or more of the disks 46 to be generated.

Moreover, the implement 10 and/or the work vehicle 12 may include one or more field condition sensors 110 coupled thereto and/or supported thereon. The field condition sensor(s) 110 is configured to generate data indicative of one or more conditions of the field, such as soil moisture level, crop material type, residue coverage, and/or the like. As will be described below, the data may subsequently be used to determine a minimum load threshold value indicative of simultaneous plugging of a majority of the disks 46, which will be used to determine when the majority of the disks 46 are simultaneously plugged.

In several embodiments, the field condition sensor(s) 110 may correspond to any suitable field condition sensor(s) configured to generate data indicative of the soil moisture level of the field. For example, in one embodiment, the field condition sensor(s) 110 may be configured as an optic sensor(s). However, in alternative embodiments, the field condition sensor(s) 110 may be configured as any other suitable sensor configured to generate data indicative of the soil moisture level of the field.

Additionally, in alternative embodiments, the field condition sensor(s) 110 may correspond to any suitable field condition sensor(s) configured to generate data indicative of a type of crop material present within the field. In several embodiments, the field condition sensor(s) 110 may be configured as an imaging device(s) configured to depict the type of crop material present within a portion(s) of the field within a field(s) of view 112 of the imaging device(s). For example, the imaging device(s) may be configured as a light detection and ranging (LiDAR) imaging device(s). However, in alternative embodiments, the imaging device(s) may be configured as any other suitable imaging device(s) configured to depict the type of crop material present within the portion(s) of the field within the field(s) of view 112 of the imaging device(s), such as a camera(s) and/or the like.

Furthermore, in alternative embodiments, the field condition sensor(s) 110 may correspond to any suitable field condition sensor(s) configured to generate data indicative of residue coverage within the field, such as a percentage of the field within a given area that is covered with crop residue. In several embodiments, the field condition sensor(s) 110 may be configured as an imaging device(s) configured to depict the residue coverage present within a portion(s) of the field within the field(s) of view 112 of the imaging device(s). For example, the imaging device(s) may be configured as a light detection and ranging (LiDAR) imaging device(s). However, in alternative embodiments, the imaging device(s) may be configured as any other suitable imaging device(s) configured to depict the residue coverage present within the portion(s) of the field within the field(s) of view 112 of the imaging device(s), such as a camera(s) and/or the like. Additionally, it should be appreciated that the field condition sensor(s) 110 may be configured as any other suitable field condition sensor(s) configured to generate data indicative of any other condition(s) of the field.

Moreover, the implement 10 and/or the work vehicle 12 may include any number of field condition sensors 110 provided at any suitable location that allows data indicative of the condition(s) of the field to be generated. In this respect, FIGS. 1 and 2 illustrate example locations for mounting the field condition sensor(s) 110 for generating data indicative of the condition(s) of the field. As shown in FIGS. 1 and 2, in several embodiments, the field condition sensor(s) 110 may be mounted to the implement frame 28 of the implement 10 and/or the frame 20 of the work vehicle 12 such that the field condition sensor(s) 110 are configured to depict the type of crop material. the residue coverage, and/or the soil moisture level within the portion of the field within the field(s) of view 112. However, in alternative embodiments, the field condition sensor(s) 110 may be installed at any other suitable location(s) that allows the field condition sensor(s) 110 to generate data indicative of the condition(s) of the field.

Additionally, the implement 10 may include one or more depth sensors 114 coupled thereto and/or supported thereon. The depth sensor(s) 114 is configured to generate data indicative of a soil penetration depth of the plurality of disks 46. As will be described below, the data may subsequently be used to determine the minimum load threshold value indicative of simultaneous plugging of the majority of the disks 46 which will be used to determine when the majority of the disks 46 are simultaneously plugged.

In general, the depth sensor(s) 114 may correspond to any suitable depth sensors configured to generate data indicative of the soil penetration depth of the disks 46. In several embodiments, the depth sensor(s) 114 may be configured as a pressure-based sensor. However, in alternative embodiments, the depth sensor(s) 114 may be configured as any other suitable depth sensors for generating data indicative of the soil penetration depth of the disks 46.

Additionally, the implement 10 may include any number of depth sensors 114 provided at any suitable location that allows data indicative of the soil penetration depth of the disks 46 to be generated. In this respect, FIGS. 1 and 2 illustrate example locations for mounting the depth sensor(s) 114 for generating data indicative of the soil penetration depth of the disks 46. As shown in FIGS. 1 and 2, when the depth sensor(s) 114 are configured as a pressure-based sensor(s), the depth sensor(s) 114 may be coupled to the structural frame member(s) 38. For example, the depth sensor(s) 114 may be coupled to the structural frame member(s) 38 between the structural frame member(s) 38 and the disk gang(s) 44. In this respect, the depth sensor(s) 44 may detect pressure in a vertical direction (as indicated by arrow 68) between the disk gang(s) 44 and the structural frame member(s) 38 created by movement of the disk gang(s) 44 relative to the structural frame member(s) 38. Such pressure between the disk gang(s) 44 and the structural frame member(s) 38 is indicative of the soil penetration depth of the disks 46. However, it should be appreciated that the depth sensor(s) 114 may be provided at any other suitable location at allows data indicative of the soil penetration depth of the disks 46 to be generated.

Figure 3:
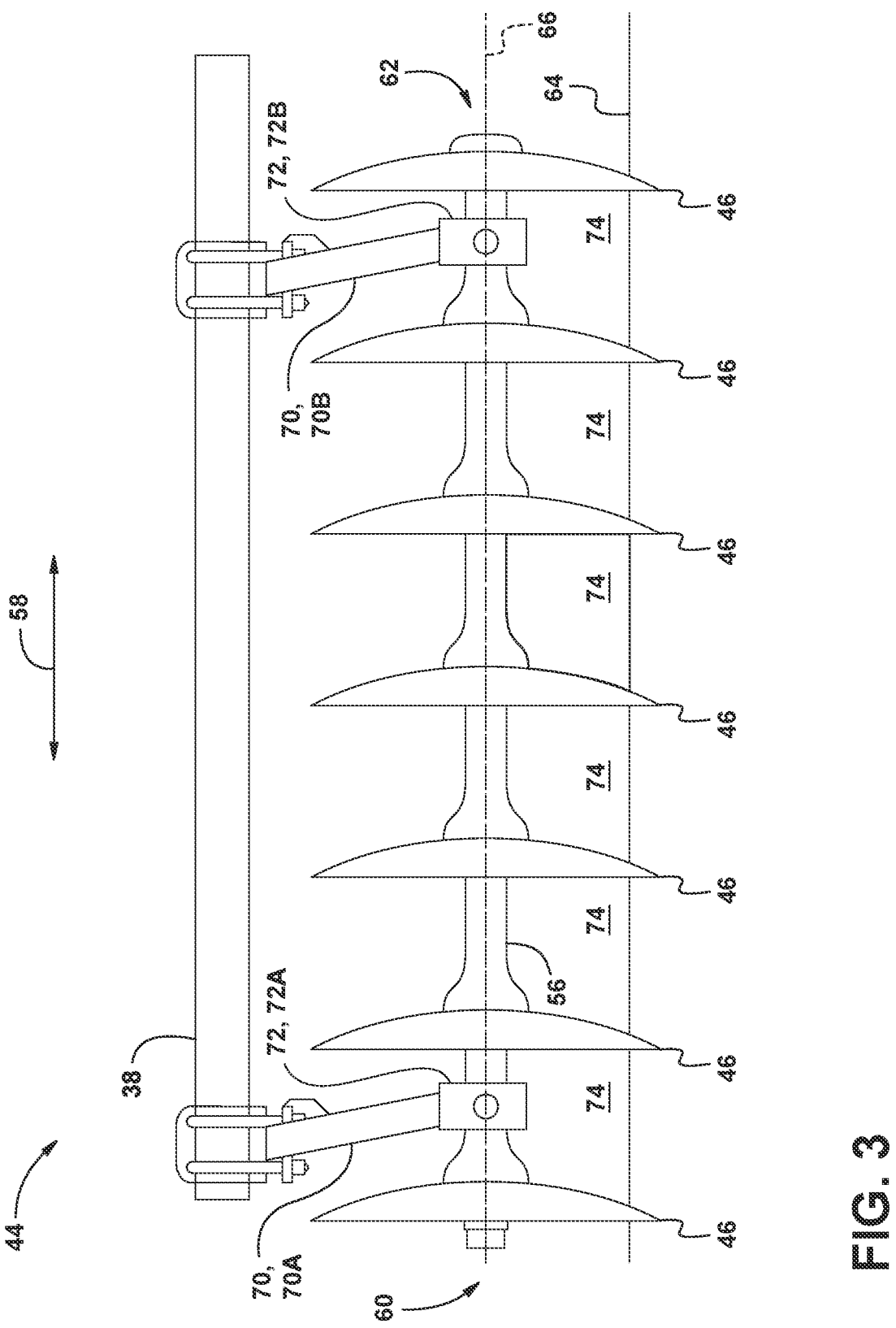
FIG. 3 illustrates a front view of one embodiment of a plurality of disks of a tillage implement supported on a disk gang in accordance with aspects of the present subject matter.

Referring now to FIG. 3, a front view of one embodiment of a plurality of disks 46 of the implement 10 supported on a disk gang 44 is illustrated in accordance with aspects of the present subject matter. Specifically, in several embodiments, the disk gang 44 may include a disk gang shaft 56 that extends along an axial direction or length of the disk gang 44 (e.g., as indicated by arrow 58 in FIG. 3) between a first end 60 and a second end 62. As shown, the disks 46 are coupled to the disk gang shaft 56 and spaced apart from each other along the axial direction 58. As the implement 10 is moved across a field, the disks 46 may be configured to penetrate the soil surface (e.g., as indicated by line 64 in FIG. 3) of the field and rotate about an axis of rotation (e.g., as indicated by dashed line 66 in FIG. 3) relative to the soil within the field.

In general, the disk gang 44 is supported relative to the corresponding structural frame member 38 of the implement frame 28. Specifically, in several embodiments, a pair of hangers 70 (e.g., C-hangers) support the disk gang 44 at a position below the corresponding structural frame member 38. For example, in one embodiment, one end of each hanger 70 may be coupled to the corresponding structural frame member 38, while the opposing end of each hanger 70 is coupled to a bearing block 72. The bearing blocks 72, in turn, are rotatably coupled to the disk gang shaft 56. However, in alternative embodiments, the disk gang 44 may have any other suitable configuration.

As shown in FIG. 3, a plurality of flow zones 74 through which field materials may flow during the operation of the implement 10 may be defined by the disks 46. Specifically, in several embodiments, each flow zone 74 may be defined directly between a pair of adjacent disks 46 in the axial direction 58. However, in alternative embodiments, each flow zone 74 may be defined between a single disk 46 and another component of the implement 10, such as a scraper, a C-hanger, and/or the like. In this respect, as the implement 10 travels across the field, field materials (e.g., soil, residue, rocks, and/or the like) may flow through the flow zone 74 as such field materials are being tilled or otherwise processed by the disks 46. During normal, non-plugged operation of the disk gang 44, substantially all of the field materials being processed by the disk gang 44 flow through the flow zones 74, with only minimal field materials becoming trapped or otherwise accumulating within the flow zones 74. However, when a sufficient amount of field materials accumulates with one or more of the flow zones 74 such that rotation of the disks 46 is impacted (e.g., the rotational speed of the disks 46 is reduced or the disks 46 stop rotating), the disk gang 44 is considered plugged. The draft load(s) applied to the disks 46 because of the plugging, in turn, is applied by the disks 46 on the corresponding structural frame member 38 of the implement frame 28.

The configuration of the tillage implement 10 described above and shown in FIG. 3 is provided only to place the present subject matter in an exemplary field of use. Thus, the present subject matter may be readily adaptable to any manner of implement configuration.

Figure 4:
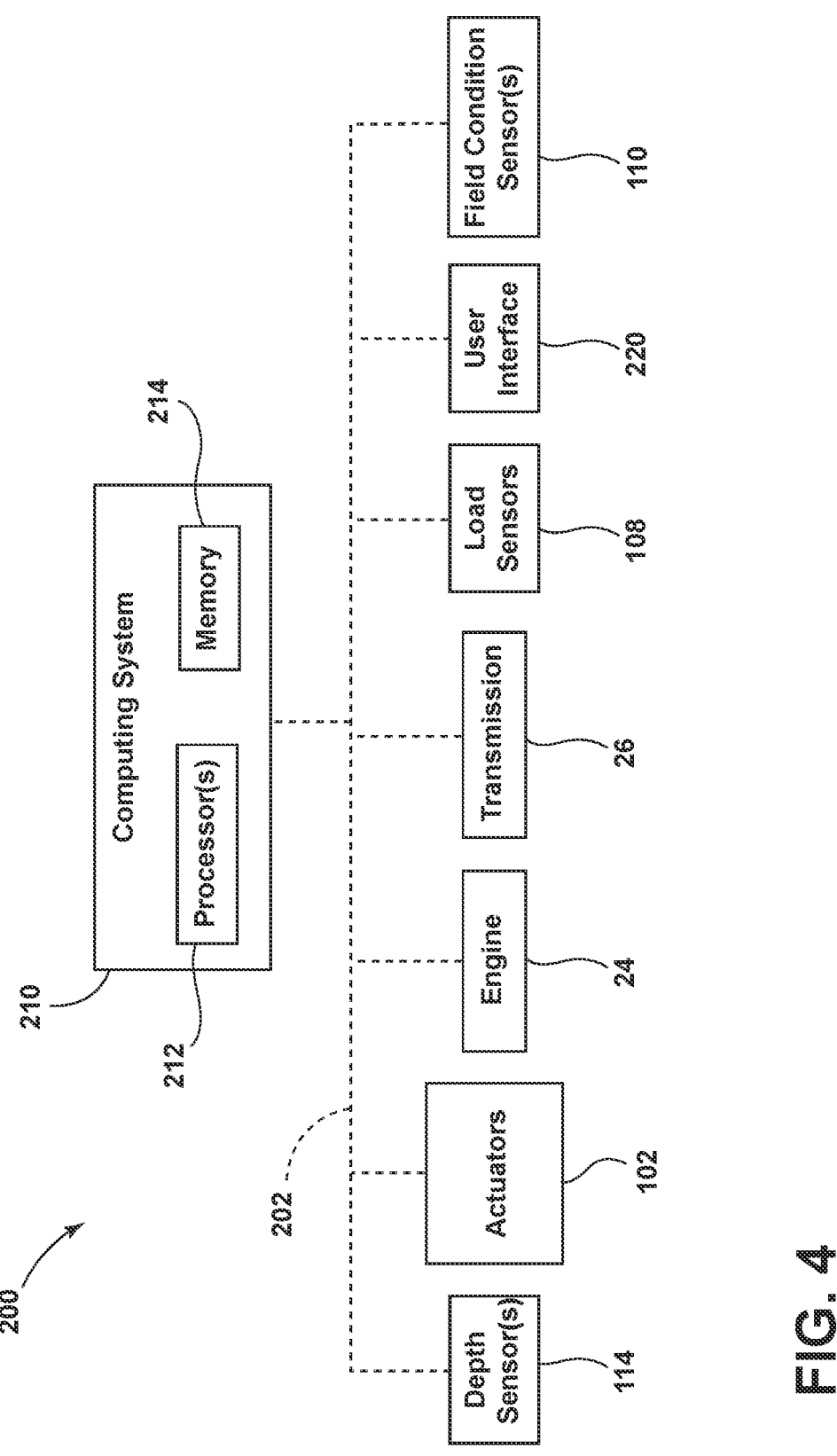
FIG. 4 illustrates a schematic view of one embodiment of a system for detecting simultaneous disk plugging on a tillage implement in accordance with aspects of the present subject matter.

Referring now to FIG. 4, a schematic view of one embodiment of a system 200 for detecting disk plugging on a tillage implement is illustrated in accordance with aspects of the present subject matter. In general, the system 200 will be described herein with reference to the tillage implement 10 and the work vehicle 12 described above with reference to FIGS. 1-3. However, the disclosed system 200 may generally be utilized with tillage implements having any other suitable implement configuration and/or with work vehicles having any other suitable vehicle configuration.

As shown in FIG. 4, the system 200 generally includes one or more components of the tillage implement 10 and/or the work vehicle 12. For example, in the illustrated embodiment, the system 200 includes the engine 24 and the transmission 26 of the work vehicle 12, and the actuators 102, the plurality of load sensors 108, the field condition sensor(s) 110, and the depth sensor(s) 114 of the tillage implement 10.

Moreover, the system 200 includes a computing system 210 communicatively coupled to one or more components of the tillage implement 10, the work vehicle 12, and/or the system 200 to allow the operation of such components to be electronically or automatically controlled by the computing system 210. For instance, the computing system 210 may be communicatively coupled to the plurality of load sensors 108 via a communicative link 202. As such, the computing system 210 may be configured to receive data from the load sensors 108 that is data indicative of the draft loads being applied to the implement frame 28 by one or more of the disks 46. Additionally, the computing system 210 may be communicatively coupled to the field condition sensor(s) 110 via the communicative link 202. As such, the computing system 210 may be configured to receive data from the field condition sensor(s) 110 that is data indicative of the condition(s) of the field. Moreover, the computing system 210 may be communicatively coupled to the depth sensor(s) 114 via the communicative link 202. As such, the computing system 210 may be configured to receive data from the depth sensor(s) 114, such as data indicative of the soil penetration depth of the disks 46. Furthermore, the computing system 210 may be communicatively coupled to the engine 24, the transmission 26, and/or the actuators 102 via the communicative link 202. In this respect, the computing system 210 may be configured to control the operation of the components 24, 26, 102. In addition, the computing system 210 may be communicatively coupled to any other suitable components of the implement 10, the vehicle 12, and/or the system 200.

In general, the computing system 210 may include any suitable processor-based device known in the art, such as a given controller or computing device or any suitable combination of controllers or computing devices. Thus, in several embodiments, the computing system 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the implement 10, itself, or the computing system 210 may correspond to a separate processing device. For instance, in one embodiment, the computing system 210 may form all or part of a separate plug-in module that may be installed in association with the implement 10 to allow for the disclosed systems to be implemented without requiring additional software to be uploaded onto existing control devices of the implement 10.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

In addition, the system 200 may also include a user interface 220. More specifically, the user interface 220 may be configured to provide feedback from the computing system 210 (e.g., feedback associated with simultaneous plugging of the majority of the disks 46) to the operator. As such, the user interface 220 may include one or more feedback devices (not shown), such as display screens, speakers, warning lights, and/or the like, which are configured to provide feedback from the computing system 210 to the operator. As such, the user interface 220 may, in turn, be communicatively coupled to the computing system 210 via the communicative link 202 to permit the feedback to be transmitted from the computing system 210 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. In one embodiment, the user interface 220 may be mounted or otherwise positioned within the cab 22 of the work vehicle 12. However, in alternative embodiments, the user interface 220 may mounted at any other suitable location.

Referring now to FIG. 5, a flow diagram of one embodiment of control logic 300 that may be executed by the computing system 210 (or any other suitable computing system) for detecting simultaneous disk plugging on a tillage implement is illustrated in accordance with aspects of the present subject matter. Specifically, the control logic 300 shown in FIG. 5 is representative of steps of one embodiment of an algorithm that can be executed to detect simultaneous disk plugging on the tillage implement 10 based on a determined total draft load being applied to the implement frame 28 as conditions of the field fluctuate. Thus, in several embodiments, the control logic 300 may be advantageously utilized in association with a system installed on or forming part of a tillage implement to allow for real-time detection of simultaneous disk plugging on a tillage implement without requiring substantial computing resources and/or processing time. However, in other embodiments, the control logic 300 may be used in association with any other suitable system, application, and/or the like for detecting simultaneous disk plugging on a tillage implement.

As shown in FIG. 5, at (302), the control logic 300 includes accessing an input indicative of a condition of the field. Specifically, in several embodiments, the computing system 210 may be configured to access one or more inputs indicative of one or more conditions of the field. For example, the computing system 210 may be configured to an access an input(s) indicative of the soil moisture level of the field, the residue coverage within the field, the type of crop material present within the field, and/or the like.

As mentioned previously, in several embodiments, the computing system 210 is communicatively coupled to the field condition sensor(s) 110 via the communicative link 202. In this respect, as the implement/vehicle 10/12 travels across the field to perform a tillage operation thereon, the computing system 210 may receive data from the field condition sensor(s) 110 indicative of the condition(s) of the field. For example, the computing system 210 may be configured to receive the data from the field condition sensor(s) 110 indicative of the soil moisture level of the field, the residue coverage within the field, the type of crop material within the field, and/or the like.

Additionally, or alternatively, in several embodiments, the computing system 210 may be configured to access a field map. In general, the field map may be stored within the memory device(s) 214 of the computing system 210 and/or in a remote database server (not shown) and include geo-referenced data that is indicative of the condition(s) of the field, such as geo-referenced data indicative of the soil moisture level of the field, the residue coverage within the field, the type of crop material within the field, and/or the like. For example, the geo-referenced data used to create the field map may be collected during a previously performed agricultural operation (e.g., a field scouting operation with an unmanned aerial vehicle (UAV) or drone, a harvesting operation, and/or the like). In this respect, as the implement 10 traverses the field, the computing system 210 may access the field map from its memory device(s) 214. The field map may, in turn, identify the condition(s) of the field at one or more locations within the field.

Additionally, or alternatively, in several embodiments, the computing system 210 may be communicatively coupled to the user interface 220 via the communicative link 202. In this respect, the computing system 210 configured to receive an operator input indicative of the condition(s) of the field, such as operator input indicative of the soil moisture level of the field, the residue coverage within the field, the type of crop material within the field, and/or the like.

Moreover, at (304), the control logic 300 includes determining the condition of the field based on the accessed input indicative of the condition of the field. Specifically, in several embodiments, the computing system 210 may be configured to determine the condition(s) of the field based on the input accessed in (302). For example, the computing system 210 may access a look-up table(s) stored within its memory device(s) 214 that correlates the input accessed at (302) to the condition(s) of the field.

Additionally, at (306), the control logic 300 includes accessing an input indicative of the soil penetration depth of the plurality of disks. Specifically, as mentioned above, in several embodiments, the computing system 210 is communicatively coupled to the depth sensor(s) 114 via the communicative link 202. In this respect, as the implement/vehicle 10/12 travels across the field to perform a tillage operation thereon, the computing system 210 may receive data from the depth sensor(s) 114 indicative of the soil penetration depth of the disks 46.

Furthermore, at (308), the control logic 300 includes determining the soil penetration depth of the plurality of disks based on the accessed input indicative of the soil penetration depth of the plurality of disks. Specifically, in several embodiments, the computing system 210 may be configured to determine the soil penetration depth of the plurality of disks based on the input accessed in (306). For example, the computing system 210 may access a look-up table(s) stored within its memory device(s) 214 that correlates the input accessed at (306) to the soil penetration depth.

Moreover, as shown in FIG. 5, at (310), the control logic 300 includes determining a minimum load threshold value based on at least one of the condition of the field or the soil penetration depth of the plurality of disks. The minimum load threshold value, in turn, may be a minimum value above which all the majority of the disks 46 are simultaneously plugged. Specifically, in several embodiments, the computing system 210 is configured to determine the minimum load threshold value indicative of simultaneous plugging of the majority of the disks 46 based on at least one of the condition(s) of the field determined at (304) or the soil penetration depth of the plurality of disks 46 determined at (308) while the implement 10 traverses the field. In several embodiments, the computing system 210 may be configured to determine the minimum load threshold value based on the condition(s) of the field determined at (304) and/or the soil penetration depth determined at (308). For example, in several embodiments, the computing system 210 may be configured to determine the minimum load threshold value based on received field condition sensor data, such as the data indicative of the soil moisture level, the type of crop material present within the field, and/or the residue coverage present within the field.

Additionally, or alternatively, in several embodiments, the computing system 210 may be configured to determine the minimum load threshold value based on the accessed field map and/or the received operator input indicative of the of the soil moisture level, the type of crop material present within the field, and/or the residue coverage present within the field. Furthermore, in several embodiments, the computing system 210 may be configured to determine the minimum load threshold value based on the received depth sensor data indicative of the soil penetration depth of the disks 46. Moreover, the computing system 210 may access a look-up table(s) stored within its memory device(s) 214 that correlates the condition(s) of the field determined at (304) and/or the soil penetration depth determined at (308) to the minimum load threshold value.

Furthermore, at (312), the control logic 300 includes receiving load sensor data indicative of a draft load being applied to the implement frame by at least one disk of the plurality of disk as the tillage implement traverses the field. Specifically, as mentioned above, in several embodiments, the computing system 210 may be communicatively coupled to the plurality of load sensors 108 via the communicative link 202. In this respect, the computing system 210 may receive the load sensor data from the load sensors 108 indicative of the draft load being applied to the implement frame 28 by one or more of the disks 46.

Additionally, at (314), the control logic 300 includes determining a plurality of draft loads based on the received load sensor data, each draft load of the plurality of draft loads being applied to the implement frame by the at least one disk of the plurality of disks. In this respect, in several embodiments, the computing system 210 may be configured to determine a plurality of draft loads, each being applied to the implement frame 28 by one or more of the disks 46, based on the load sensor data received at (312). For example, the computing system 210 may access a look-up table(s) stored within its memory device(s) 214 that correlates the load sensor data received at (312) to the plurality of draft loads.

Moreover, at (316), the control logic 300 includes determining a total draft load being applied to the implement frame based on the determined plurality of draft loads. In this respect, in several embodiments, the computing system 210 may be configured to determine the total draft load being applied to the implement frame 28 based on the plurality of draft loads determined at (314). For example, the computing system 210 may be configured to determine a sum of the plurality of draft loads determined at (304) to determine the total draft load.

Furthermore, as shown in FIG. 5, at (318), the control logic 300 includes comparing the determined total draft load to the determined minimum load threshold value. Specifically, in several embodiments, the computing system 210 is configured to compare the total draft load determined at (316) to the minimum load threshold value determined at (310). When the total draft load determined at (316) exceeds the minimum load threshold value determined at (310), it is likely that the majority of the disks 46 of the tillage implement 10 are simultaneously plugged. In such instances, the control logic 300 proceeds to (320). Conversely, when the total draft load determined at (316) is at or falls below the minimum load threshold value determined at (310), it is unlikely that the majority of the disks 46 of the tillage implement 10 are simultaneously plugged. In such instances, the control logic 300 returns to (302).

Additionally, at (320), the control logic 300 includes determining that the majority of disks of the plurality of disks are simultaneously plugged when the determined total draft load exceeds the minimum load threshold value. Specifically, in several embodiments, the computing system 210 is configured to determine that the majority of the disks 46 are simultaneously plugged when the total draft load determined at (316) exceeds the minimum load threshold value determined at (310).

Moreover, at (322), the control logic 300 includes initiating a control action associated with de-plugging the majority of disks of the plurality of disks that are simultaneously plugged. Specifically, in several embodiments, the computing system 210 is configured to initiate one or more control actions associated with the disks 46 of the tillage implement 10 being plugged. For example, in one embodiment, the control action(s) include providing a notification to the operator of the implement/vehicle 10/12 that the majority of the disks 46 are plugged. In such an embodiment, the computing system 210 may transmit suitable control signals to the user interface 220 instructing the user interface 220 to provide the appropriate notification to the operator. Alternatively, or additionally, the control action(s) include reducing or halting the ground speed of the implement/vehicle 10/12. In such an embodiment, the computing system 210 may transmit suitable control signals to the engine 24 and/or transmission 26 of the vehicle 12 instructing the engine 24 and/or transmission 26 to reduce or halt the ground speed of the implement/vehicle 10/12. Thereafter, the control logic 300 returns to (302).

Referring now to FIG. 6, a flow diagram of one embodiment of a method 400 for detecting simultaneous disk plugging on a tillage implement is illustrated in accordance with aspects of the present subject matter. In general, the method 400 will be described herein with reference to the tillage implement 10 and the system 200 described above with reference to FIGS. 1-5. However, it should be appreciated by those of ordinary skill in the art that the disclosed method 400 may generally be implemented with any tillage implements having any suitable implement configuration, work vehicles having any suitable vehicle configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 includes receiving, with a computing system, load sensor data indicative of a draft load being applied to the frame by at least one disk of the plurality of disks as the tillage implement traverses the field. For instance, as described above, the computing system 210 may be configured to receive load sensor data indicative of the draft load being applied to the implement frame 28 by at least one disk 46 of the plurality of disks 46 as the implement 10 traverses the field.

Furthermore, as shown in FIG. 6, at (404), the method 400 includes determining, with the computing system, a plurality of draft loads based on the received load sensor data, each draft load of the plurality of draft loads being applied to the frame by the at least one disk of the plurality of disks. For instance, as described above, the computing system 210 may be configured to determine the plurality of draft loads based on the received load sensor data.

Moreover, as shown in FIG. 6, at (406), the method 400 includes determining, with the computing system, a total draft load being applied to the frame based on the determined plurality of draft loads. For instance, as described above, the computing system 210 may be configured to determine the total draft load being applied to the implement frame 28 based on the determined plurality of draft loads.

Additionally, as shown in FIG. 6, at (408), the method 400 includes determining, with the computing system, when a majority of disks of the plurality of disks are simultaneously plugged based on the determined total draft load. For instance, as described above, the computing system 210 may be configured to determine when the majority of the disks 46 are simultaneously plugged based on the determined total draft load.

Furthermore, as shown in FIG. 6, at (410), the method 400 includes initiating, with the computing system, a control action associated with de-plugging the majority of disks of the plurality of disks that are simultaneously plugged. For instance, as described above, the computing system 210 may be configured to initiate one or more control actions associated with de-plugging the majority of the disks 46 when it is determined that the majority of the disks 46 are plugged. Such control action(s) may include providing a notification to the operator of the implement/vehicle 10/12, slowing/halting the ground speed of the implement/vehicle 10/12, adjusting the position of the disk(s) 46 (e.g., adjust the position of the disk gang(s) 44) relative to the implement frame 28, and/or the like.

It is to be understood that the steps of the control logic 300 and the method 400 are performed by the computing system 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 210 described herein, such as the control logic 300 and the method 400, is implemented in software code or instructions which are tangibly stored on a tangible computer readable medium. The computing system 210 loads the software code or instructions via a direct interface with the computer readable medium or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A tillage implement, comprising:
a frame;
a plurality of ground-engaging shanks supported by the frame and configured to till soil of a field as the tillage implement traverses the field;
a plurality of disks supported by the frame, each disk configured to rotate relative to the soil of the field;
a plurality of load sensors, each load sensor of the plurality of load sensors configured to generate data indicative of a draft load being applied to the frame by at least one disk of the plurality of disks as the tillage implement traverses the field; and
a computing system communicatively coupled to the plurality of load sensors, the computing system configured to:
determine a plurality of draft loads based on the data generated by the plurality of load sensors, each draft load of the plurality of draft loads being applied to the frame by the at least one disk of the plurality of disks;
determine a total draft load being applied to the frame based on the determined plurality of draft loads; and
determine when a majority of disks of the plurality of disks are simultaneously plugged based on the determined total draft load.

2. The tillage implement of claim 1, wherein, when determining when the majority of disks of the plurality of disks are simultaneously plugged, the computing system is configured to:
compare the determined total draft load to a minimum load threshold value; and
determine that the majority of disks of the plurality of disks are simultaneously plugged when the determined total draft load exceeds the minimum load threshold value.

3. The tillage implement of claim 1, wherein:
the plurality of disks are configured to engage the soil of the field at a soil penetration depth, and
the computing system is further configured to:
access an input indicative of the soil penetration depth of the plurality of disks; and
determine a minimum load threshold value based on the soil penetration depth of the plurality of disks.

4. The tillage implement of claim 3, wherein the computing system is further configured to:
access an input indicative of a type of crop material present within the field; and

determine the minimum load threshold value based on the type of crop material present within the field and the soil penetration depth of the plurality of disks.

5. A system for detecting simultaneous disk plugging on a tillage implement, the system comprising:
  a plurality of disks supported by a frame of the tillage implement, each disk configured to rotate relative to soil of a field;
  a plurality of load sensors, each load sensor of the plurality of load sensors configured to generate data indicative of a draft load being applied to the frame by at least one disk of the plurality of disks as the tillage implement traverses the field; and
  a computing system communicatively coupled to the plurality of load sensors, the computing system configured to:
    determine a plurality of draft loads based on the data generated by the plurality of load sensors, each draft load of the plurality of draft loads being applied to the frame by the at least one disk of the plurality of disks;
    determine a total draft load being applied to the frame based on the determined plurality of draft loads; and
    determine when a majority of disks of the plurality of disks are simultaneously plugged based on the determined total draft load.

6. The system of claim 5, wherein, when determining when the majority of disks of the plurality of disks are simultaneously plugged, the computing system is configured to:
  compare the determined total draft load to a minimum load threshold value; and
  determine that the majority of disks of the plurality of disks are simultaneously plugged when the determined total draft load exceeds the minimum load threshold value.

7. The system of claim 5, wherein:
  the plurality of disks are configured to engage the soil of the field at a soil penetration depth, and
  the computing system is further configured to:
    access an input indicative of the soil penetration depth of the plurality of disks; and
    determine a minimum load threshold value based on the soil penetration depth of the plurality of disks.

8. The system of claim 7, further comprising:
  a depth sensor communicatively coupled to the computing system, the depth sensor configured to generate data indicative of the soil penetration depth of the plurality of disks,
  wherein, when accessing the input indicative of the soil penetration depth of the plurality of disks, the computing system is configured to:
    receive data from the depth sensor indicative of the soil penetration depth of the plurality of disks; and
    determine the soil penetration depth of the plurality of disks based on the received data from the depth sensor.

9. The system of claim 7, wherein:
  when accessing the input indicative of the soil penetration depth of the plurality of disks, the computing system is configured to receive an operator input indicative of the soil penetration depth of the plurality of disks; and
  the computing system is configured to determine the soil penetration depth of the plurality of disks based on the received operator input.

10. The system of claim 5, wherein the computing system is further configured to:
  access an input indicative of a type of crop material present within the field; and
  determine the minimum load threshold value based on the type of crop material present within the field.

11. The system of claim 10, wherein:
  when accessing the input indicative of the type of crop material present within the field, the computing system is configured to receive an operator input indicative of the type of crop material present within the field; and
  the computing system is configured to determine a minimum load threshold value based on the type of crop material present within the field.

12. The system of claim 10, wherein:
  when accessing the input indicative of the type of crop material present within the field, the computing system is configured to access a field map identifying the type of crop material present within the field at one or more locations within the field; and
  the computing system is configured to determine a minimum load threshold value based on the type of crop material present within the field.

13. The system of claim 5, wherein, when it is determined that the majority of disks of the plurality of disks are simultaneously plugged, the computing system is configured to:
  initiate a control action associated with de-plugging the majority of disks of the plurality of disks that are simultaneously plugged.

14. The system of claim 13, wherein the control action comprises notifying an operator of the tillage implement that the majority of disks of the plurality of disks are simultaneously plugged.

15. The system of claim 13, wherein the control action comprises adjusting a ground speed of the tillage implement.

16. A method for detecting simultaneous disk plugging on a tillage implement, the tillage implement including a frame and a plurality of disks supported by the frame, each disk configured to rotate relative to soil of a field, the method comprising:
  receiving, with a computing system, load sensor data indicative of a draft load being applied to the frame by at least one disk of the plurality of disks as the tillage implement traverses the field;
  determining, with the computing system, a plurality of draft loads based on the received load sensor data, each draft load of the plurality of draft loads being applied to the frame by the at least one disk of the plurality of disks;
  determining, with the computing system, a total draft load being applied to the frame based on the determined plurality of draft loads;
  determining, with the computing system, when a majority of disks of the plurality of disks are simultaneously plugged based on the determined total draft load; and
  initiating, with the computing system, a control action associated with de-plugging the majority of disks of the plurality of disks that are simultaneously plugged.

17. The method of claim 16, wherein determining when the majority of disks of the plurality of disks are simultaneously plugged comprises:
  comparing, with the computing system, the determined total draft load to a minimum load threshold value; and
  determining, with the computing system, that the majority of disks of the plurality of disks are simultaneously plugged when the determined total draft load exceeds the minimum load threshold value.

18. The method of claim 16, further comprising:
accessing, with the computing system, an input indicative
of a soil penetration depth at which the plurality of
disks are configured to engage the soil of the field; and
determining, with the computing system, a minimum load
threshold value based on the soil penetration depth.

19. The method of claim 18, wherein:
accessing the input indicative of the soil penetration depth
of the plurality of disks comprises receiving, with the
computing system, depth sensor data indicative of the
soil penetration depth of the plurality of disks; and
the method further comprises determining, with the com-
puting system, a minimum load threshold value based
on the received depth sensor data.

20. The method of claim 16, further comprising:
accessing, with the computing system, an input indicative
of a type of crop material present within the field; and
determining, with the computing system, a minimum load
threshold value based on the type of crop material
present within the field.

* * * * *